US008080172B2

(12) United States Patent
Iannicelli

(10) Patent No.: US 8,080,172 B2
(45) Date of Patent: Dec. 20, 2011

(54) METHOD AND COMPOSITION FOR CONTROLLED HEAT RELEASE AND DISPOSABLE CHEMICAL HEATER UTILIZING SAME

(75) Inventor: Joseph Iannicelli, Jekyll Island, GA (US)

(73) Assignee: J.I. Enterprises, Inc., Brunswick, GA (US)

( * ) Notice: Subject to any disclaimer, the term of this patent is extended or adjusted under 35 U.S.C. 154(b) by 942 days.

(21) Appl. No.: 11/275,591

(22) Filed: Jan. 18, 2006

(65) Prior Publication Data
US 2007/0164253 A1 Jul. 19, 2007

(51) Int. Cl.
*C09K 5/18* (2006.01)
*C11D 3/39* (2006.01)
*F24J 2/00* (2006.01)
*F24J 3/00* (2006.01)

(52) U.S. Cl. .......... 252/186.25; 126/263.01; 126/263.05

(58) Field of Classification Search ............. 126/263.01, 126/263.05; 252/186.25
See application file for complete search history.

(56) References Cited

U.S. PATENT DOCUMENTS

| | | | |
|---|---|---|---|
| 2,239,410 A | | 4/1941 | Bonat |
| 2,388,466 A | * | 11/1945 | Caldwell ................ 126/263.01 |
| 2,500,790 A | * | 3/1950 | Bennett ................ 126/263.01 |
| 2,953,443 A | | 9/1960 | Lloyd |
| 4,872,442 A | | 10/1989 | Manker |
| 4,880,953 A | | 11/1989 | Manker |
| 4,895,133 A | * | 1/1990 | Collins et al. ................ 126/204 |
| 5,035,230 A | | 7/1991 | Steidl et al. |
| 5,984,953 A | | 11/1999 | Sabin et al. |
| 6,099,555 A | | 8/2000 | Sabin |
| 6,116,231 A | | 9/2000 | Sabin et al. |
| 6,379,561 B1 | * | 4/2002 | Reidies et al. ................ 210/758 |
| 6,389,839 B1 | | 5/2002 | Sabin |
| 6,393,843 B2 | | 5/2002 | Kohout |
| 6,513,516 B2 | | 2/2003 | Sabin et al. |
| 6,550,223 B2 | | 4/2003 | Xiong et al. |
| 6,640,801 B2 | | 11/2003 | Sabin et al. |
| 2002/0111601 A1 | * | 8/2002 | Thompson ................ 604/514 |
| 2003/0101984 A1 | | 6/2003 | Li et al. |

FOREIGN PATENT DOCUMENTS

| | | |
|---|---|---|
| GB | 679770 A | 9/1952 |
| GB | 826815 A | 1/1960 |
| GB | 866038 A | 4/1961 |
| GB | 1422974 A | 1/1976 |
| JP | 2000336352 A | 12/2000 |

OTHER PUBLICATIONS

Walas, S.M. (1990). Chemical Process Equipment—Selection and Design. (pp. 268-271). Elsevier. Online version available at: http://www.knovel.com/knovel2/Toc.jsp?BookID=401&VerticalID=0.*
Tatterson, Gary B. "Plump up Your Particles", in Chemical Processing Magazine, Dec. 2002. Accessed through http://www.ChemicalProcessing.com on Oct. 24, 2007.*

* cited by examiner

*Primary Examiner* — Peter F Godenschwager
(74) *Attorney, Agent, or Firm* — Kenneth E. Darnell

(57) ABSTRACT

A method and composition for controlling an exothermic reaction between a powerful oxidizing agent such as the permanganate salts, and reducing agents such as polyhydroxy organic compounds, comprises non-charged, relatively hydrophobic pigments which can be slurried at relatively high solids. The pigment may be calcium carbonate, diatomaceous earth (diatomite), talc, or blends thereof. The pigments are not flocculated in permanganate slurries and can be dispersed at high solids contents. The dispersions can be spray dried or pelletized with controllable moisture contents from about 0.1 to 10%. The resulting composition yields effective control of the exothermic reaction with more uniform and reproducible results.

12 Claims, No Drawings

METHOD AND COMPOSITION FOR CONTROLLED HEAT RELEASE AND DISPOSABLE CHEMICAL HEATER UTILIZING SAME

FIELD OF THE INVENTION

The present invention is directed to methods and compositions for controlling an exothermic reaction between a powerful oxidizing agent and a reducing agent, and disposable chemical heaters using such compositions.

DESCRIPTION OF RELATED ART

Heat packs designed for controlled heat release have been the subject of intense investigation during the past fifteen years. Conventional disposable heat packs typically generate heat via an exothermic reaction between an oxidizing agent, such as a permanganate salt, and a reducing agent, such as polyhydroxy organic compounds, such as ethylene glycol, glycerine, or propylene glycol. Several documents describe controlling the exothermic heat release by encapsulating the oxidizing agent with sodium silicate or the like. Examples of such heat packs are shown in Steidl et al. U.S. Pat. No. 5,035,230 and Sabin et al. U.S. Pat. No. 5,984,953. Bonat U.S. Pat. No. 2,239,410 describes a heat pack adapted for permanently waving hair. An envelope or sachet contains a mixture of finely comminuted particles of potassium permanganate and silica or other inert filler or earth. The use of silica or inert filler is said to control heat release by delaying the reaction between the permanganate when contacted with a fuel.

One of the difficulties encountered with silicate encapsulation is that during spray drying, the soluble silicate separates from the mostly insoluble permanganate. As a result, it is difficult to achieve uniform coatings of the silicates on the permanganate crystals. The problem can be further compounded by subsequent attempts to dissolve the silicate in a controlled manner during the reaction of the permanganate with the reducing agent (fuel). The resulting exotherms often are erratic, non-uniform and non-reproducible, and fail to provide a gradual and controlled temperature rise over a period of 5 to 10 minutes or more. In addition, separated silicate can form solid coatings on equipment surfaces along with permanganate dust, which complicates equipment cleaning and also results in product loss.

There remains a need for improved disposable chemical heaters, especially heaters which can provide a gradual controlled temperature rise followed by a sustained temperature for a period of time, such as a sustained temperature of about 100 to 200° F. over a period of 5 to 10 minutes or more.

SUMMARY OF THE INVENTION

The present invention, according to one aspect, is directed to a method and composition for controlling an exothermic reaction between an oxidizing agent and a reducing agent. The composition comprises non-charged, lyophobic (e.g., hydrophobic) pigments which can be slurried with the oxidizing agent at relatively high solids, e.g., 50% or more, to provide diluent moderation and improved drying economics. Examples of suitable pigments include calcium carbonate, diatomaceous earth (diatomite), and talc. The pigments are not flocculated in permanganate slurries and can be dispersed at high solids contents.

In another aspect of the present invention, a disposable chemical heater comprises such compositions for generating a controlled heat release.

In one embodiment, dispersions or slurries are spray dried with controllable moisture contents from about 0.1 to 10%. In another embodiment, dispersions or slurries are pelletized. The compositions of the present invention yield effective control of the exothermic reaction with more uniform and reproducible results.

DETAILED DESCRIPTION OF THE INVENTION

The present invention is directed to methods and compositions for controlling an exothermic reaction between a powerful oxidizing agent such as the permanganate salts, e.g., sodium-, potassium-, or calcium permanganate, and reducing agents such as polyhydroxy organic compounds, e.g., ethylene glycol, glycerine, or propylene glycol. Another aspect of the invention is directed to disposable chemical heaters utilizing such compositions.

A variety of oxidizing agents are capable of generating suitable energies upon reaction with a reducing agent. Preferred oxidizing agents are those comprising the alkali metal salts of the oxides of manganese and chromium, such as potassium permanganate and potassium chromate. Non-limiting examples of other suitable oxidizing agents include pyridinium dichromate, ruthenium tetroxide, and chromic acid. The choice of oxidizing agent is typically made with disposability as a key consideration. After use of the disposable heater, the residue preferably does not contain soluble toxic or otherwise environmentally undesirable components.

In accordance with one embodiment of the present invention, an oxidizing agent is combined with a lyophobic pigment in a slurry, and then spray dried or pelletized to produce pigment-coated oxidizer particles. Preferred pigments are in the clay size particle range (e.g., about 0.25 to 10 µm) and include calcium carbonate, diatomaceous earth (diatomite), and talc. These and related lyophobic pigments are not flocculated in permanganate slurries and can be dispersed at solids ranging up to about 70% (w/w). Dispersions can be spray dried or pelletized with controllable moisture contents from about 0.1% to 10% (w/w).

As will be understood by persons skilled in the art, particle size can determined based on a mesh aperture. A particle which does not pass through a mesh having a 50×50 micrometer aperture is considered to have a particle size of about 50 micrometers or more. A particle which passes through a mesh having a 500×500 micrometer aperture is considered to have a particle size of about 500 micrometers or less. A particle which meets both of these criteria thus has a particle size from about 50 to about 500 micrometers. In a typical pigment of this particle size, the distribution of particle size normally will be such that at least about 95% (v/v) of particles will have a particle size of least about 50 micrometers and at least about 98% (v/v) will have a particle size of about 500 micrometers or less.

In one embodiment, a dispersion or slurry containing a permanganate oxidizer and a pigment is spray dried. Spray drying can be accomplished by combining one or more ingredients using a conventional rotary atomizer, which typically uses a single fluid such as water, or a nozzle atomizer which can employ either single or dual fluid. The particle size of the spray dried particles typically ranges from about 50 to 500 microns, more usually from about 75 to about 300 microns.

In another embodiment, a dispersion or slurry containing a permanganate oxidizer and a pigment is pelletized. Pelletizing can be accomplished, for example, by combining the ingredients in a conventional drum or spherical pelletizer. The particle size of the pelletized particles typically ranges from about 500 to 10,000 microns, more usually from about 800 to about 8,000 microns.

Because it is possible to achieve excellent control of the permanganate/pigment composition (permanganate concentration typically ranges from about 40 to 80 wt %), more reproducible exotherms can be produced with near-quantitative utilization of the permanganate oxidizer.

The permanganate oxidizer may also contain controlled amounts of pigment particles that contain minor quantities, e.g., about 5 to 30 wt %, of moisture. The moisture is released during the exotherm resulting from oxidation of the polyol reducing agent.

In addition, small amounts of binders such as sodium or potassium silicate or polysilicates optionally may be incorporated in the permanganate/pigment formulation during manufacture.

The reducing agent can be any of a number of soluble solid or liquid organic compounds. Particularly well suited organic compounds are those containing hydroxyl groups. Such groups are easily oxidized to carbonyl-containing compounds by the oxidizing agents described herein. Preferable fuels are sugars or alcohols, and polyhydroxyl-containing compounds which contain at least two hydroxyl groups, such as ethylene glycol, glycerine, or propylene glycol. Such polyhydroxyl-containing compounds are also readily oxidized to aldehydes, ketones, carboxylic acids, and/or carbon dioxide. This oxidation of polyhydroxyl-containing compounds and the simultaneous reduction of the oxidizing agent is accompanied by the release of significant amounts of heat energy.

The compositions may be used in disposable chemical heaters of conventional construction. Non-limiting examples of suitable heater configurations are shown in U.S. Pat. Nos. 4,872,442, 5,035,230, and 5,984,953, the disclosures of which are hereby incorporated by reference.

EXAMPLE 1

A slurry of 5 kg sodium permanganate and 5 kg of calcium carbonate in 10 kg of water was spray dried at an inlet temperature of 570° F. and an outlet temperature of 240° F. to furnish a uniform pink product averaging 50 μm and having 50 wt % potassium permanganate solids.

EXAMPLE 2

The procedure of Example 1 was repeated using 5 kg potassium permanganate and 5 kg diatomaceous earth (50 wt % solids) instead of calcium carbonate. The resulting product had 50 wt % potassium permanganate solids.

EXAMPLE 3

The procedure of Example 1 was repeated using 5 kg potassium permanganate and 5 kg talc (50 wt % solids) instead of calcium carbonate. The resulting product had 50 wt % potassium permanganate solids.

EXAMPLE 4

The procedure of Example 1 was repeated using 5 kg of potassium permanganate to 2.5 kg of calcium carbonate in 8 kg water (48.4 wt % solids). The resulting product had 67 wt % potassium permanganate solids.

EXAMPLE 5

The procedure of Example 1 was repeated using 5 kg of potassium permanganate to 1.67 kg of calcium carbonate in 6.5 kg water (50.7 wt % solids). The resulting product had 75 wt % potassium permanganate solids.

EXAMPLE 6

The procedure of Example 2 was repeated using 5 kg of sodium permanganate and 2.5 kg diatomaceous earth in 10 kg water (48 wt % solids). The resulting product had 67 wt % sodium permanganate solids.

EXAMPLE 7

The procedure of Example 3 was repeated using 5 kg of sodium permanganate and 1.67 kg of diatomaceous earth in 6.5 kg water (50.7 wt % solids). The resulting product had 75 wt % sodium permanganate solids.

EXAMPLE 8

The procedure of Example 3 was repeated using 5 kg potassium permanganate and 2.5 kg talc in 8 kg water (48.4 wt % solids). The resulting product had 67 wt % potassium permanganate solids.

EXAMPLE 9

The procedure of Example 3 was repeated using 5 kg potassium permanganate and 1.67 kg talc in 6.5 kg water (50.7 wt % solids). The resulting product had 75 wt % potassium permanganate solids.

EXAMPLE 10

50 grams of potassium permanganate powder prepared in accordance with the teachings of U.S. Pat. No. 5,984,953 was mixed with 40 grams of pulverized sugar and treated with 130 ml of 33% by volume glycerine solution. The mixture reached a temperature of 95° F. in 2 minutes 30 seconds.

EXAMPLE 11

Example 1 was mixed with 40 grams of pulverized sugar and further treated with 130 ml of 33% by volume of glycerine solution. The mixture reached a temperature of 100° F. in 2 minutes 30 seconds.

EXAMPLE 12

The procedure of Example 11 was repeated using 50 g of the product form Example 7 (1:1 sodium permanganate/diatomaceous earth). The mixture reached a temperature of 100° F. in 6 minutes 20 seconds, and a temperature of 110° F. in 8 minutes.

EXAMPLE 13

The procedure of Example 11 was repeated using 50 g of the product from Example 8 (1:1 potassium permanganate/talc). The mixture reached a temperature of 100° F. in 6 minutes 20 seconds, and a temperature of 115° F. in 8 minutes.

Results from Examples 11, 12, and 13 demonstrate a clear advantage for the compositions of this invention compared to prior art methods using potassium permanganate and sodium silicate.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A composition for generating a controlled heat release, the composition comprising a reducing agent and an oxidizing agent, wherein the oxidizing agent comprises oxidizer particles coated with calcium carbonate.

2. The composition of claim 1, wherein the oxidizer is selected from the group consisting of sodium permanganate, potassium permanganate, calcium permanganate and blends thereof.

3. The composition of claim 1, wherein the reducing agent comprises at least one polyhydroxy organic compound.

4. The composition of claim 3, wherein the reducing agent is selected from the group consisting of ethylene glycol, glycerine, propylene glycol, and combinations thereof.

5. The composition of claim 1 wherein the oxidizing agent comprising particles having a particle size of from about 50 to about 10,000 μm.

6. The composition of claim 5 wherein the particle size is from about 50 to about 500 μm.

7. A disposable chemical heater comprising the composition of claim 1.

8. A process for preparing an oxidizing agent for generating a controlled heat release when contacted with a reducing agent, the process comprising spray drying a slurry containing an oxidizer and calcium carbonate.

9. The process of claim 8 wherein the spray drying is carried out via rotary or fluid nozzle atomization.

10. A process for preparing an oxidizing agent for generating a controlled heat release when contacted with a reducing agent, the process comprising pelletizing a slurry containing an oxidizer and calcium carbonate.

11. The process of claim 10 wherein the pelletizing is carried out via a spherical pelletizer.

12. The process of claim 10 wherein the pelletizing is carried out via a pin mixer pelletizer.

* * * * *